US010630113B2

(12) United States Patent
Tsai et al.

(10) Patent No.: US 10,630,113 B2
(45) Date of Patent: Apr. 21, 2020

(54) POWER SUPPLY DEVICE OF INDUCTION TYPE POWER SUPPLY SYSTEM AND RF MAGNETIC CARD IDENTIFICATION METHOD OF THE SAME

(71) Applicant: Fu Da Tong Technology Co., Ltd, New Taipei (TW)

(72) Inventors: Ming-Chiu Tsai, New Taipei (TW); Chi-Che Chan, New Taipei (TW)

(73) Assignee: Fu Da Tong Technology Co., Ltd, New Taipei (TW)

(*) Notice: Subject to any disclaimer, the term of this patent is extended or adjusted under 35 U.S.C. 154(b) by 26 days.

(21) Appl. No.: 16/132,464

(22) Filed: Sep. 16, 2018

(65) Prior Publication Data

US 2019/0027971 A1  Jan. 24, 2019

Related U.S. Application Data

(63) Continuation-in-part of application No. 16/028,397, filed on Jul. 5, 2018, which is a continuation-in-part (Continued)

(30) Foreign Application Priority Data

Feb. 1, 2011 (TW) .............................. 100103836 A
Mar. 14, 2012 (TW) .............................. 101108610 A
(Continued)

(51) Int. Cl.
*G06F 1/26* (2006.01)
*H02J 50/05* (2016.01)
(Continued)

(52) U.S. Cl.
CPC ................ *H02J 50/12* (2016.02); *G05F 1/66* (2013.01); *G06F 1/266* (2013.01); *H02J 50/05* (2016.02)

(58) Field of Classification Search
CPC .. G05F 1/66; G06F 1/266; H02J 50/05; H02J 50/12
See application file for complete search history.

(56) References Cited

U.S. PATENT DOCUMENTS 4,393,516 A   7/1983  Itani
5,270,998 A  12/1993  Uchiumi
(Continued)

FOREIGN PATENT DOCUMENTS

CN   1142649 A   2/1997
CN   1476535 A   2/2004
(Continued)

OTHER PUBLICATIONS

Yang, "A multi-coil wireless charging system with parasitic mental detection", Donghua University Master Dissertation, China Master's Theses Full-Text Database, Engineering Technology II, vol. 09, May 2014.

*Primary Examiner* — Abdelmoniem I Elamin
(74) *Attorney, Agent, or Firm* — CKC & Partners Co., LLC

(57) ABSTRACT

A power supply device used in an induction type power supply system is provided that includes a power supply coil, an auxiliary coil, a power supply driving module, a auxiliary driving module, a harmonic frequency measuring module, a voltage measuring module and a processing module. The power supply driving module drives the power supply coil. The auxiliary driving module drives the auxiliary coil. The harmonic frequency measuring module measures a resonance frequency of the power-supply coil according to a capacitive and inductive parameter related to the power-supply coil. The voltage measuring module tracks and locks a maximum of an oscillation voltage of the auxiliary coil. When the processing module determines that the resonance frequency is stable and the oscillation voltage decreases
(Continued)

more than a predetermined ratio of the oscillation voltage, the processing module keeps the power supply driving module under a non-working status.

16 Claims, 2 Drawing Sheets

Related U.S. Application Data of application No. 14/535,338, filed on Nov. 7, 2014, now Pat. No. 10,056,944, which is a continuation-in-part of application No. 14/251,655, filed on Apr. 14, 2014, now Pat. No. 9,671,444, and a continuation-in-part of application No. 13/900,544, filed on May 23, 2013, now Pat. No. 9,600,021, which is a continuation-in-part of application No. 13/488,724, filed on Jun. 5, 2012, now Pat. No. 9,048,881, and a continuation-in-part of application No. 15/231,795, filed on Aug. 9, 2016, now Pat. No. 10,289,142, which is a continuation-in-part of application No. 15/005,014, filed on Jan. 25, 2016, now Pat. No. 10,114,396, and a continuation-in-part of application No. 15/197,796, filed on Jun. 30, 2016, now Pat. No. 10,312,748, which is a continuation-in-part of application No. 14/822,875, filed on Aug. 10, 2015, now Pat. No. 9,960,639, and a continuation-in-part of application No. 14/876,788, filed on Oct. 6, 2015, now Pat. No. 9,831,687, and a continuation-in-part of application No. 14/731,421, filed on Jun. 5, 2015, now Pat. No. 10,038,338, which is a continuation-in-part of application No. 13/541,090, filed on Jul. 3, 2012, now Pat. No. 9,075,587, and a continuation-in-part of application No. 14/017,321, filed on Sep. 4, 2013, now Pat. No. 9,628,147, and a continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072.

(30) Foreign Application Priority Data

| | | |
|---|---|---|
| Feb. 4, 2013 | (TW) | 102104223 A |
| May 3, 2013 | (TW) | 102115983 A |
| Jan. 8, 2014 | (TW) | 103100707 A |
| Jun. 6, 2014 | (TW) | 103119790 A |
| Jan. 14, 2015 | (TW) | 104101227 A |
| Jun. 2, 2015 | (TW) | 104117722 A |
| Jun. 30, 2015 | (TW) | 104121025 A |
| Oct. 28, 2015 | (TW) | 104135327 A |
| Apr. 14, 2016 | (TW) | 105111620 A |
| May 13, 2016 | (TW) | 105114827 A |
| Feb. 12, 2018 | (TW) | 107105016 A |
| Jul. 17, 2018 | (TW) | 107124689 A |

(51) Int. Cl.
*H02J 50/12* (2016.01)
*G05F 1/66* (2006.01)

(56) References Cited

U.S. PATENT DOCUMENTS

| | | | |
|---|---|---|---|
| 7,310,245 B2* | 12/2007 | Ohbo | H02M 3/3376 363/17 |
| 7,587,007 B2 | 9/2009 | Alamonti et al. | |
| 7,720,452 B2 | 5/2010 | Miyahara | |
| 7,939,963 B2 | 5/2011 | Chang | |
| 8,072,310 B1 | 12/2011 | Everhart | |
| 8,422,420 B1 | 4/2013 | Gulasekaran | |
| 8,731,116 B2 | 5/2014 | Norconk | |
| 9,048,881 B2 | 6/2015 | Tsai | |
| 9,075,587 B2 | 7/2015 | Tsai | |
| 9,099,884 B2* | 8/2015 | Jung | H01F 38/14 |
| 9,331,496 B2* | 5/2016 | Doi | H02J 50/12 |
| 9,424,446 B2* | 8/2016 | Baarman | G01F 23/20 |
| 9,559,553 B2* | 1/2017 | Bae | H02J 50/60 |
| 2003/0123168 A1 | 7/2003 | Yokomizo | |
| 2005/0076102 A1 | 4/2005 | Chen | |
| 2008/0030398 A1 | 2/2008 | Nakamura | |
| 2009/0026844 A1 | 1/2009 | Iisaka | |
| 2009/0271048 A1 | 10/2009 | Wakamatsu | |
| 2009/0284082 A1 | 11/2009 | Mohammadian | |
| 2009/0302800 A1 | 12/2009 | Shiozaki | |
| 2010/0237943 A1 | 9/2010 | Kim | |
| 2010/0270867 A1 | 10/2010 | Abe | |
| 2010/0277003 A1* | 11/2010 | Von Novak | H02J 50/70 307/104 |
| 2011/0196544 A1 | 8/2011 | Baarman | |
| 2012/0068552 A1* | 3/2012 | Nishino | H01F 38/14 307/104 |
| 2012/0139356 A1* | 6/2012 | Jung | H01F 38/14 307/104 |
| 2012/0153739 A1 | 6/2012 | Cooper | |
| 2012/0272076 A1 | 10/2012 | Tsai | |
| 2012/0293009 A1 | 11/2012 | Kim | |
| 2013/0002037 A1* | 1/2013 | Doi | H02J 50/12 307/104 |
| 2013/0049484 A1 | 2/2013 | Weissentern | |
| 2013/0162054 A1 | 6/2013 | Komiyama | |
| 2013/0162204 A1 | 6/2013 | Jung | |
| 2013/0175873 A1 | 7/2013 | Kwon | |
| 2013/0175937 A1 | 7/2013 | Nakajo | |
| 2013/0176023 A1 | 7/2013 | Komiyama | |
| 2013/0267213 A1 | 10/2013 | Hsu | |
| 2013/0342027 A1 | 12/2013 | Tsai | |
| 2014/0024919 A1 | 1/2014 | Metzenthen | |
| 2014/0077616 A1 | 3/2014 | Baarman | |
| 2014/0084857 A1 | 3/2014 | Liu | |
| 2014/0117760 A1* | 5/2014 | Baarman | H01F 38/14 307/38 |
| 2014/0152251 A1 | 6/2014 | Kim | |
| 2014/0184152 A1 | 7/2014 | Van Der Lee | |
| 2014/0355314 A1 | 12/2014 | Ryan | |
| 2015/0008756 A1 | 1/2015 | Lee | |
| 2015/0028875 A1 | 1/2015 | Irie | |
| 2015/0044966 A1 | 2/2015 | Shultz | |
| 2015/0054355 A1 | 2/2015 | Ben-Shalom | |
| 2015/0123602 A1 | 5/2015 | Patino | |
| 2015/0162054 A1 | 6/2015 | Ishizu | |
| 2015/0162785 A1 | 6/2015 | Lee | |
| 2015/0285926 A1 | 10/2015 | Oettinger | |
| 2016/0241086 A1 | 8/2016 | Jung | |
| 2016/0241087 A1* | 8/2016 | Bae | H02J 7/025 |
| 2018/0123378 A1 | 5/2018 | Kaechi | |
| 2019/0058358 A1* | 2/2019 | Bae | H02J 7/02 |
| 2019/0267845 A1* | 8/2019 | Maniktala | H02J 50/40 |

FOREIGN PATENT DOCUMENTS

| | | |
|---|---|---|
| CN | 1930790 A | 3/2007 |
| CN | 101106388 A | 1/2008 |
| CN | 101907730 A | 12/2010 |
| CN | 101978571 A | 2/2011 |
| CN | 102457109 A | 5/2012 |
| CN | 102474133 A | 5/2012 |
| CN | 102804619 A | 11/2012 |
| CN | 103069689 A | 4/2013 |
| CN | 103248130 A | 8/2013 |
| CN | 103425169 A | 12/2013 |
| CN | 103457361 A | 12/2013 |
| CN | 103852665 A | 6/2014 |
| CN | 103975497 A | 8/2014 |
| CN | 104065172 A | 9/2014 |
| CN | 104143862 A | 11/2014 |

(56) References Cited

FOREIGN PATENT DOCUMENTS

| | | |
|---|---|---|
| CN | 104521151 A | 4/2015 |
| CN | 104685760 A | 6/2015 |
| CN | 104734370 A | 6/2015 |
| CN | 105049008 A | 11/2015 |
| CN | 105308829 A | 2/2016 |
| CN | 105449875 A | 3/2016 |
| CN | 205105005 U | 3/2016 |
| EP | 2608419 A2 | 6/2013 |
| EP | 2793355 A1 | 10/2014 |
| JP | 2008206305 A | 9/2008 |
| JP | 2010213414 A | 9/2010 |
| JP | 2013135518 A | 7/2013 |
| JP | 2014171371 A | 9/2014 |
| JP | 2017511117 A | 4/2017 |
| KR | 100650628 B1 | 11/2006 |
| TW | 201034334 A1 | 9/2010 |
| TW | I389416 B | 3/2013 |
| TW | I408861 B | 9/2013 |
| TW | 201414130 A | 4/2014 |
| TW | 201415752 A | 4/2014 |
| TW | 201440368 A | 10/2014 |
| TW | I459676 B | 11/2014 |
| TW | I472897 B | 2/2015 |
| TW | I483509 B | 5/2015 |
| TW | 201631862 A | 9/2016 |
| WO | 2013043974 A2 | 3/2013 |
| WO | 2015154086 A1 | 10/2015 |
| WO | 2017194338 A1 | 11/2017 |

\* cited by examiner

POWER SUPPLY DEVICE OF INDUCTION TYPE POWER SUPPLY SYSTEM AND RF MAGNETIC CARD IDENTIFICATION METHOD OF THE SAME

RELATED APPLICATIONS

This application claims priority to Taiwan Application Serial Number 107124689, filed Jul. 17, 2018, and is a continuation-in-part application of U.S. application Ser. No. 15/231,795 filed Aug. 9, 2016, now U.S. Pat. No. 10,289,142, which is a continuation-in-part application of U.S. application Ser. No. 15/005,014, filed on Jan. 25, 2016, now U.S. Pat. No. 10,114,396, and a continuation-in-part application of U.S. application Ser. No. 15/197,796, filed on Jun. 30, 2016, now U.S. Pat. No. 10,312,748, which is further a continuation-in-part application of U.S. application Ser. No. 14/822,875, filed on Aug, 10, 2015, now U.S. Pat. No. 9,960,639, a continuation-in-part application of U.S. application Ser. No. 14/731,421, filed on Jun. 5, 2015, now U.S. Pat. No. 10,038,338, and a continuation-in-part application of U.S. application Ser. No. 14/876,788, filed on Oct. 6, 2015, now U.S. Pat. No. 9,831,687, the contents of which are incorporated herein by reference.

U.S. application Ser. No. 14/731,421 is further a continuation-in-part application of U.S. application Ser. No. 14/017,321, filed on Sep. 4, 2013, now U.S. Pat. No. 9,628,147, and a continuation-in-part application of U.S. application Ser. No. 13/541,090, filed on Jul. 3, 2012, now U.S. Pat. No. 9,075,587. U.S. application Ser. No. 14/017,321 is further a continuation-in-part application of U.S. application Ser. No. 13/541,090, filed on Jul. 3, 2012, now U.S. Pat. No. 9,075,587, and a continuation-in-part application of U.S. application. Ser. No. 13/212,564, filed on Aug. 18, 2011, now U.S. Pat. No. 8,941,267, which is further a continuation-in-part application of U.S. application Ser. No. 13/154,965, filed on Jun. 7, 2011, now U.S. Pat. No. 8,810,072. U.S. application Ser. No. 14/876,788 is further a continuation-in-part application of U.S. application Ser. No. 14/017,321, filed on Sep. 4, 2013, now U.S. Pat. No. 9,628,147.

This application claims is also a continuation-in-part application of U.S. application Ser. No. 16/028,397 filed Jul. 5, 2018, still pending, which is a continuation.-in-part application of U.S. application Ser. No. 14/535,338, filed on Nov. 7, 2014, now U.S. Pat. No. 10,056,944, wherein U.S. application Ser. No. 14/535,338 is further a continuation-in-part application of U.S. application Ser. No. 14/251,655, filed on Apr. 14, 2014, now U.S. Pat. No. 9,671,444, a continuation-in-part application of U.S. application Ser. No. 14/017,321, filed on Sep. 4, 2013, now U.S. Pat. No. 9,628,147 and a continuation-in-part application of U.S. application Ser. No. 13/900,544, filed on May 23, 2013, now U.S. Pat. No. 9,600,021, wherein U.S. application Ser. No. 14/251,655 is further a continuation-in-part application of U.S. application Ser. No. 14/017,321, now U.S. Pat. No. 9,628,147, and U.S. application Ser. No. 14/017,321 is further a continuation-in-part application of U.S. application. Ser. No. 13/212,564, filed on Aug. 18, 2011, now U.S. Pat. No. 8,941,267 and a continuation-in-part application of U.S. application Ser. No. 13/541,090, filed on Jul. 3, 2012, now U.S. Pat. No. 9,075,587, wherein U.S. application Ser. No. 13/212,564 is further a continuation-in-part application of U.S. application Ser. No. 13/154,965, filed on Jun. 7, 2011, now U.S. Pat. No. 8,810,072. U.S. application Ser. No. 13/900,544 is further a continuation-in-part application of U.S. application Ser. No. 13/488,724 filed on Jun. 5, 2012, now U.S. Pat. No. 9,048,881, which is further a continuation-in-part application of U.S. application Ser. No. 13/154,965, now U.S. Pat. No. 8,810,072. The contents of these applications are incorporated herein by reference.

BACKGROUND

Field of Invention

The present invention relates to an induction type power supply technology. More particularly, the present invention relates to a power supply device of an induction type power supply system and a RF magnetic card identification method of the same.

Description of Related Art

In an induction type power supply system, a power supply device is used to drive the power supply coil by using a drive circuit such that the power supply coil is resonant to deliver electromagnetic energy. The coil of the power receiving device further receives the electromagnetic energy generated by the resonant power supply coil to convert the energy to a direct current. The transmission of the power is thus completed.

In daily life, RF magnetic cards can use near field communication (NFC) technology to perform communication. However, most of the RF magnetic cards can be driven by receiving a small amount of electromagnetic energy. When the RF magnetic card receives too large amount of the electromagnetic energy, the chip therein can be damaged. If the user accidentally puts the RF magnetic card on the power supply coil of the power supply device of the induction type power supply system and the detection mechanism is absent in the power supply device, the chip of the RF magnetic card may be damaged during the transmission of the power signal.

Accordingly, what is needed is an integrated circuit and an operation method of the same to address the issues mentioned above.

SUMMARY

The invention provides a power supply device used in an induction type power supply system that includes a power supply coil, a auxiliary coil, a power supply driving module, an auxiliary driving module, a resonant frequency measuring module, a voltage measuring module and a processing module. The power supply driving module is electrically coupled to the power supply coil and is configured to drive the power supply coil. The auxiliary driving module is electrically coupled to the auxiliary coil and is configured to drive the auxiliary coil when the power supply driving module is under a non-working status. The resonant frequency measuring module is electrically coupled to the power supply coil and is configured to measure a resonant frequency of the power supply coil according to a capacitive and inductive parameter related to the power supply coil. The voltage measuring module is electrically coupled to the auxiliary coil and is configured to track and lock a maximum of an oscillating voltage of the auxiliary coil. The processing module is configured to keep the power supply driving module under the non-working status when the resonant frequency is determined to be stable and the oscillating voltage is determined to be decreased more than a predetermined ratio.

Another aspect of the present invention is to provide a RF magnetic card identifying method used in a power supply device in an induction type power supply system. The RF magnetic card identifying method includes the steps outlined below. A power supply coil of the power supply device is driven by a power supply driving module electrically coupled to the power supply coil. A resonant frequency of the power supply coil is measured according to a capacitive and inductive parameter related to the power supply coil by a resonant frequency measuring module electrically coupled to the power supply coil. An auxiliary coil of the power supply device is driven by an auxiliary driving module electrically coupled to the auxiliary coil when the power supply driving module is under a non-working status. A maximum of an oscillating voltage of the auxiliary coil is tracked and locked by a voltage measuring module electrically coupled to the auxiliary coil. The power supply driving module is kept under a non-working status by a processing module when the resonant frequency is determined to be stable and the oscillating voltage is determined to be decreased more than a predetermined ratio.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
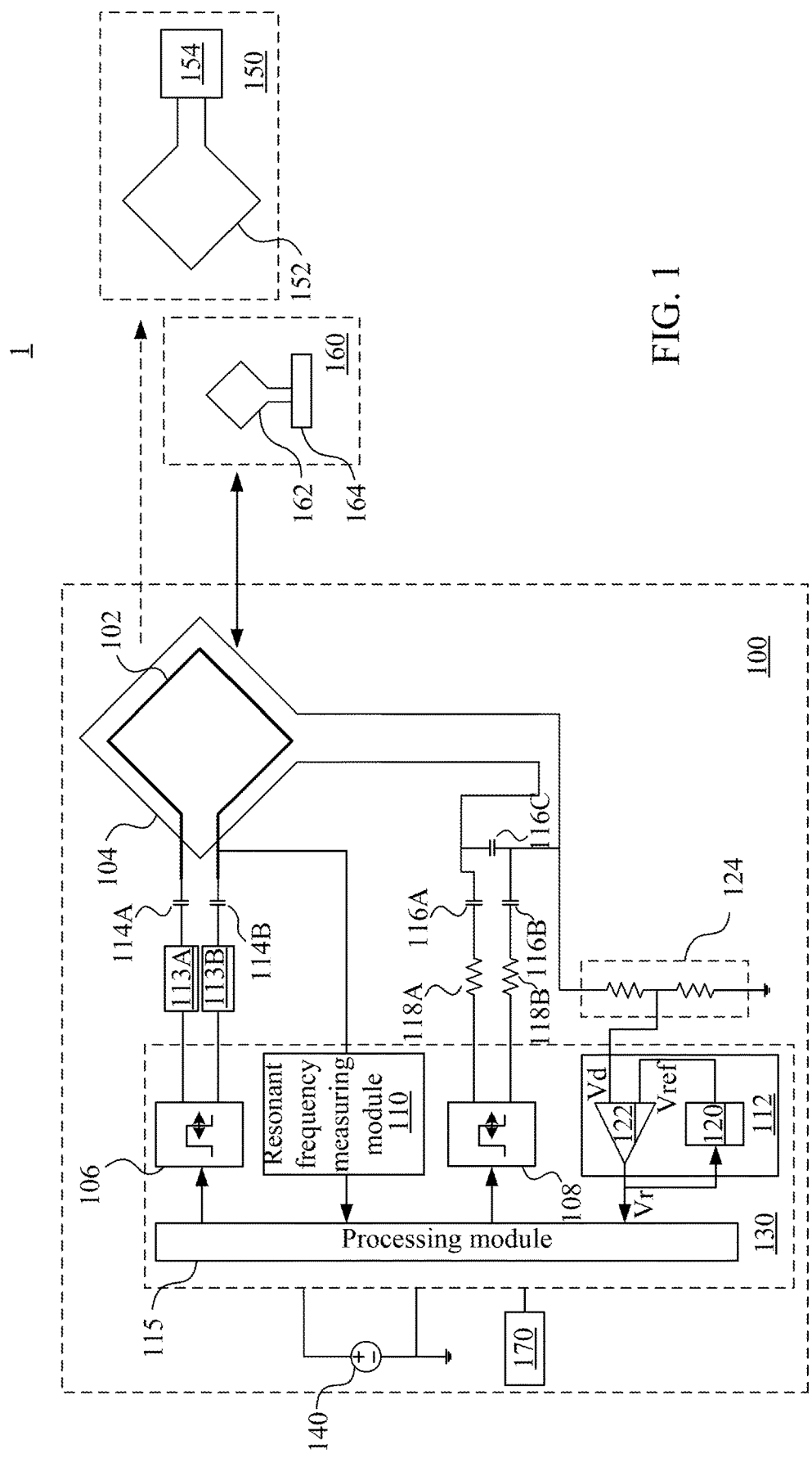
FIG. 1 is a block diagram of an induction type power supply system in an embodiment of the present invention.

Reference is now made to FIG. 1. FIG. 1 is a block diagram of an induction type power supply system 1 in an embodiment of the present invention. The induction type power supply system 1 includes a power supply device 100 and a power receiving device 150. The power supply device 100 is configured to generate power and transmit the power to the power receiving device 150 in a wireless way to supply power to the power receiving device 150.

The power supply device 100 includes a power supply coil 102, an auxiliary coil 104, a power supply driving module 106, an auxiliary driving module 108, a resonant frequency measuring module 110, a voltage measuring module 112 and a processing module 115.

In an embodiment, the power supply driving module 106, the auxiliary driving module 108, the resonant frequency measuring module 110, the voltage measuring module 112 and the processing module 115 can be integrated in a single microcontroller 130. The microcontroller 130 can be electrically coupled to a power supply 140 to receive power therefrom such that the modules of the microcontroller 130 operation accordingly. However, the present invention is not limited thereto.

The power supply driving module 106 is electrically coupled to power supply coil 102 and is configured to drive the power supply coil 102. In an embodiment, the power supply driving module 106 is a pulse width modulator (PWM) and is configured to output signals having different oscillating frequencies under the control of the processing module 115 to drive the power supply coil 102.

In an embodiment, the power supply device 100 further includes power supply resonant capacitors 114A and 114B and power switch elements 113A and 113B each electrically coupled between one of the two terminals of the power supply coil 102 and the power supply driving module 106.

When the power supply driving module 106 is under a working status, the power supply driving module 106 drives the power supply coil 102 to supply power to the power receiving device 150. In an embodiment, the power receiving device 150 includes a power receiving coil 152 and a load module 154. The power receiving coil 152 is configured to receive the power from the power supply coil 102 and perform conversion by using the load module 154.

When the power supply driving module 106 is under a non-working status, the power supply driving module 106 stops to drive the power supply coil 102 to further stop to supply power to the power receiving device 150.

The auxiliary driving module 108 is electrically coupled to the auxiliary coil 104 and is configured to drive the auxiliary coil 104 when the power supply driving module 106 is under the non-working status. In an embodiment, the auxiliary driving module 108 is a pulse width modulator and is configured to output signals having different oscillating frequencies under the control of the processing module 115 to drive the auxiliary coil 104.

In an embodiment, the power supply device 100 further includes power supply resonant capacitors 116A-116C. Each of the power supply resonant capacitors 116A and 116B is electrically coupled between one of the two terminals of the auxiliary coil 104 and the auxiliary driving module 108. The power supply resonant capacitor 116C is electrically coupled between the power supply resonant capacitors 116A and 116B. The power supply resonant capacitors 116A-116C are configured to resonate with the auxiliary coil 104 when the auxiliary driving module 108 drives the auxiliary coil 104.

In an embodiment, the power supply device 100 may selectively include a resistor 118A and a resistor 118B each electrically coupled to the power supply resonant capacitor 116A and the power supply resonant capacitor 116B is series between one of the two terminals of the auxiliary coil 104 and the auxiliary driving module 108 and each configured to limit the driving current at the port of the auxiliary driving module 108 to provide a protection mechanism.

In an embodiment, the power supply driving module operates at around 100 KHz. The auxiliary driving module 108 operates at around 13.56 MHz or 6.78 MHz. As a result, the operation frequency of the auxiliary coil 104 is higher than the operation frequency of the power supply coil.

The resonant frequency measuring module 110 is electrically coupled to the power supply coil 102 and is configured to measure a resonant frequency of the power supply coil 102 according to a capacitive and inductive parameter related to the power supply coil 102.

In an embodiment, the capacitive and inductive parameter related to the power supply coil 102 includes a combination of an inductance of the power supply coil 102 and a capacitance of the power supply resonant capacitors 114A and 114B.

The voltage measuring module 112 is electrically coupled to the auxiliary coil 104 and is configured to track and lock a maximum of an oscillating voltage Vd of the auxiliary coil 104. In an embodiment, the voltage measuring module 112 includes a digital to analog converter 120 and a comparator 122.

The digital to analog converter 120 is configured to generate a reference voltage Vref. The comparator 122 is electrically coupled to the digital to analog converter 120 and the auxiliary coil 104 and is configured to receive the reference voltage Vref and the oscillating voltage Vd of the auxiliary coil 104 to track and lock the maximum of the oscillating voltage Vd according to the comparison result Vr of the reference voltage Vref and the oscillating voltage Vd.

In an embodiment, the power supply device 100 may selectively include a voltage-dividing module 124 that is electrically coupled between the auxiliary coil 104 and the comparator 122. The oscillating voltage Vd received by the comparator 122 is a divided voltage of the voltage on the auxiliary coil 10. It is appreciated that if the components in the voltage measuring module 112 have higher endurance against the voltage, the voltage of the auxiliary coil 104 can be directly received to perform comparison with the reference voltage Vref without using the voltage-dividing module 124.

The processing module 115 determines whether the resonant frequency is stable and the oscillating voltage Vd decreases more than a predetermined ratio to further determine whether a RF magnetic card, e.g. the RF magnetic card 160 illustrated in FIG. 1, exists in a power supplying range of the power supply coil 102. It is appreciated that though the RF magnetic card 160 is illustrated together with the other components of the induction type power supply system 1 in FIG. 1, the RF magnetic card 160 is actually not a part of the induction type power supply system 1.

In an embodiment, the RF magnetic card 160 can be such as, but not limited to a module that performs communication by using NFC technology. In an embodiment, the RF magnetic card 160 may include a coil 162 and a chip module 164. When the auxiliary driving module 108 drives the auxiliary coil 104, the coil 162 of the RF magnetic card 160 receives the signal from the auxiliary coil 104, and a small amount of power is provided to the RF magnetic card 160 to drive the chip module 164 in the RF magnetic card 160 to generate a modulated signal to the coil 162. The modulated signal is reflected through the coil 162 to the auxiliary coil 104.

The determining mechanism of the processing module 115 is described in detail in the following paragraphs.

At first, the processing module 115 determines whether the resonant frequency measured by the resonant frequency measuring module 110 equals to a frequency locked value. In an embodiment, the frequency locked value is a recorded locked value of the resonant frequency of the power supply coil 102.

More specifically, when the resonant frequency does not equal to the frequency locked value, the processing module 115 determines that an object comes closer to the power supply coil 102 and causes the change of the resonant frequency. The resonant frequency is thus unstable. Further, the processing module 115 assigns the newly measured resonant frequency as the frequency locked value. When the resonant frequency equals to the frequency locked value, the processing module 115 determines that the resonant frequency is stable.

It is appreciated that the term "equal" does not mean that the two values are exactly the same. A reasonable difference can exist between the resonant frequency and the frequency locked value. When the resonant frequency and the frequency locked value are very close, i.e. the difference therebetween is smaller than a predetermined range, the resonant frequency can be determined to equal to the frequency locked value.

Moreover, under the same resonant frequency, the processing module 115 determines whether the oscillating voltage Vd measured by the voltage measuring module 112 is larger than a voltage locked value.

In an embodiment, the voltage locked value is the largest oscillating voltage Vd retrieved when the power supply coil 102 is under the same resonant frequency. As a result, relative to the currently measured oscillating voltage Vd, the voltage locked value is the previously measured oscillating voltage Vd.

More specifically, when the oscillating voltage Vd is larger than the voltage locked value (the currently measured oscillating voltage Vd is larger than the previously measured oscillating voltage Vd), the processing module 115 determines that the oscillating voltage Vd does not decrease more than the predetermined ratio and assigns the newly measured oscillating voltage Vd as the voltage locked value.

When the oscillating voltage Vd is not larger than the voltage locked value (the currently measured oscillating voltage Vd is not larger than the previously measured oscillating voltage Vd), the processing module 115 retrieves the predetermined ratio (e.g. 75%) of the voltage locked value as a threshold value. The processing module 115 further determines that the oscillating voltage Vd decreases more than the predetermined ratio when the oscillating voltage Vd is smaller than the threshold value and determines that the oscillating voltage Vd does not decrease more than the predetermined ratio when the oscillating voltage Vd is not smaller than the threshold value.

As a result, when the processing module 115 determines that the resonant frequency is stable and the oscillating voltage Vd decrease more than the predetermined ratio, the processing module 115 determines that the RF magnetic card 160 exists in the power supplying range of the power supply coil 102. Under such a condition, the processing module 115 keeps the power supply driving module 106 under the non-working status to avoid the damage on the RF magnetic card 160 caused due to the power generated when the power supply driving module 106 drives the power supply coil 102.

In an embodiment, power supply device 100 may selectively include an alert module 170. When the processing module 115 determines that the RF magnetic card 160 is detected, the processing module 115 controls the alert module to notify the user to remove the RF magnetic card 160 by using a light, a buzzer, an amplifier, a display screen or a combination thereof.

In an embodiment, the magnetic carrier of the RF magnetic card 160 absorbs the energy of the high frequency oscillation of the auxiliary coil 104 without affecting the resonant frequency of the power supply coil 102. When other metal objects are presented, the resonant frequency of the power supply coil 102 is affected while the energy of the high frequency oscillation of the auxiliary coil 104 is also absorbed. As a result, the measuring and the determining method described above makes sure that the resonant frequency of the power supply coil 102 does not change to assure that no other metal object is presented and further determines that whether the RF magnetic card 160 exists according to the oscillating voltage Vd of the auxiliary coil 104.

The power supply device 100 of the present invention measures the resonant frequency of the power supply coil 110 and tracks and locks the maximum of the oscillating voltage Vd of the auxiliary coil 112 such that the RF magnetic card 160 is determined to exist when the resonant frequency is determined to be stable and the oscillating voltage Vd is determined to be decreased more than the predetermined ratio. The power supply driving module 106 is further kept under the non-working status to avoid the damage on the RF magnetic card 160 caused due to the power generated by the power supply coil 102.

Figure 2:
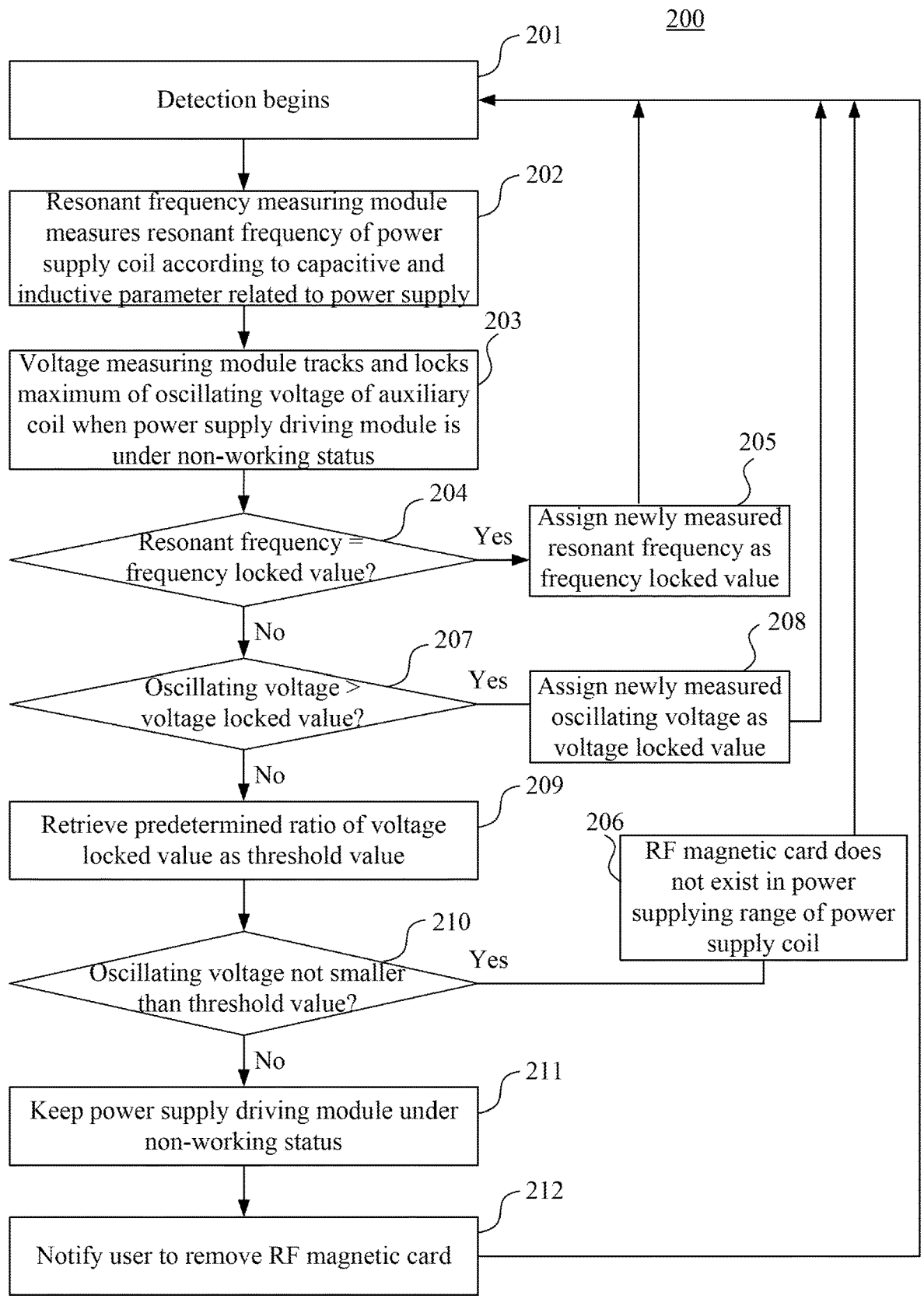
FIG. 2 is a flow chart of a RF magnetic card identifying method in an embodiment of the present invention.

Reference is now made to FIG. 2. FIG. 2 is a flow chart of a RF magnetic card identifying method 200 in an embodiment of the present invention. The RF magnetic card identifying method 200 can be used in the power supply device 100 of the induction type power supply system 1 illustrated in FIG. 1 (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the detection begins.

In step 202, the power supply coil 102 drives the power supply driving module 106 such that the resonant frequency measuring module 110 measures resonant frequency of the power supply coil 102 according to the capacitive and inductive parameter related to the power supply coil 102.

In an embodiment, the capacitive and inductive parameter related to the power supply coil 102 includes a combination of an inductance of the power supply coil 102 and a capacitance of the power supply resonant capacitors 114A and 114B.

In step 203, the auxiliary driving module 108 drives the auxiliary coil 104 when the power supply driving module 106 is under the non-working status such that the voltage measuring module 112 tracks and locks the maximum of the oscillating voltage Vd of the auxiliary coil 104.

In step 204, the processing module 115 determines whether the resonant frequency equals to the frequency locked value. In an embodiment, the frequency locked value is a recorded locked value of the resonant frequency of the power supply coil 102.

When the resonant frequency does not equal to the frequency locked value, in step 205, the processing module 115 determines that a different object comes closer to the power supply coil 102 and causes the change of the resonant frequency resonant frequency and assigns the newly measured resonant frequency as the frequency locked value.

Subsequently, the processing module 115 terminates the current detection. In an embodiment, after step 205, the flow goes back to step 201 to perform detection again. A polling method is thus used to accomplish a continuous detection.

When the resonant frequency equals to the frequency locked value, the processing module 115 determines that the resonant frequency is stable. It is appreciated that the term "equal" does not mean that the two values are exactly the same. A reasonable difference can exist between the resonant frequency and the frequency locked value. When the resonant frequency and the frequency locked value are very close, i.e. the difference therebetween is smaller than a predetermined range, the resonant frequency can be determined to equal to the frequency locked value. As a result, when the processing module 115 determines that the resonant frequency equals to the frequency locked value, in step 207, the processing module 115 further determines whether the maximum of the oscillating voltage Vd of the auxiliary coil 104 is larger than the voltage locked value.

In an embodiment, the voltage locked value is the largest oscillating voltage Vd retrieved when the power supply coil 102 is under the same resonant frequency. As a result, relative to the currently measured oscillating voltage Vd, the voltage locked value is the previously measured oscillating voltage Vd.

When the oscillating voltage Vd is larger than the voltage locked value (the currently measured oscillating voltage Vd is larger than the previously measured oscillating voltage Vd), in step 208, the processing module 115 assigns the newly measured oscillating voltage Vd as the voltage locked value.

Subsequently, the processing module 115 terminates the current detection. In an embodiment, after step 205, the flow goes back to step 201 to perform detection again. A polling method is thus used to accomplish a continuous detection.

When the oscillating voltage Vd is not larger than the voltage locked value (the currently measured oscillating voltage Vd is not larger than the previously measured oscillating voltage Vd), in step 209, the processing module 115 retrieves the predetermined ratio (e.g. 75%) of the voltage locked value as the threshold value.

In step 210, the processing module 115 determines whether the oscillating voltage Vd is not smaller than the threshold value.

When the processing module 115 determines that the oscillating voltage Vd is not smaller than the threshold value, the processing module 115 determines that the oscillating voltage Vd does not decrease more than the predetermined ratio and determines that the RF magnetic card 160 does not exist in the power supplying range of the power supply coil 102 in step 206 to terminate the current detection. In an embodiment, after step 206, the flow goes back to step 201 to perform detection again. A polling method is thus used to accomplish a continuous detection.

When the processing module 115 determines that the oscillating voltage Vd is smaller than the threshold value, the processing module 115 determines that the oscillating voltage Vd decreases more than the predetermined ratio and determines that the RF magnetic card 160 exists in the power supplying range of the power supply coil 102. The processing module 115 keeps the power supply driving module 106 under the non-working status in step 211 to avoid the damage on the RF magnetic card 160 caused due to the power generated when the power supply driving module 106 drives the power supply coil 102.

In step 212, the processing module 112 controls the alert module 170 to notify the user to remove the RF magnetic card 160.

In an embodiment, after step 212, the flow goes back to step 201 to perform detection again. A polling method is thus used to accomplish a continuous detection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power supply device used in an induction type power supply system, wherein the power supply device comprises:
   a power supply coil;
   an auxiliary coil;
   a power supply driving module electrically coupled to the power supply coil and configured to drive the power supply coil;
   an auxiliary driving module electrically coupled to the auxiliary coil and configured to drive the auxiliary coil when the power supply driving module is under a non-working status;
   a resonant frequency measuring module electrically coupled to the power supply coil and configured to measure a resonant frequency of the power supply coil according to a capacitive and inductive parameter related to the power supply coil;

a voltage measuring module electrically coupled to the auxiliary coil and configured to track and lock a maximum of an oscillating voltage of the auxiliary coil; and a processing module configured to keep the power supply driving module under the non-working status when the resonant frequency is determined to be stable and the oscillating voltage is determined to be decreased more than a predetermined ratio.

2. The power supply device of claim 1, wherein the processing module further determines that a RF magnetic card exists within a power supplying range of the power supply coil when the resonant frequency is determined to be stable and the oscillating voltage is determined to be decreased more than a predetermined ratio.

3. The power supply device of claim 1, wherein the voltage measuring module comprises:

a digital to analog converter configured to generate a reference voltage; and a comparator electrically coupled to the digital to analog converter and the auxiliary coil and configured to receive the reference voltage and the oscillating voltage to track and lock the oscillating voltage.

4. The power supply device of claim 3, wherein the comparator is configured to control the digital to analog converter to use the reference voltage to track and lock the oscillating voltage by using a feedback mechanism according to a comparison result of the oscillating voltage and the reference voltage.

5. The power supply device of claim 4, further comprising a voltage-dividing module electrically coupled between the auxiliary coil and the comparator, and the oscillating voltage received by the comparator is a divided voltage of a voltage on the auxiliary coil.

6. The power supply device of claim 1, wherein when the resonant frequency is determined to be unstable and the oscillating voltage is determined to be not decreased more than a predetermined ratio, the processing module keeps the power supply driving module under a working status to drive the power supply coil to transmit a power signal.

7. The power supply device of claim 1, wherein the processing module determines whether the resonant frequency equals to a frequency locked value and determines that the resonant frequency is stable when the resonant frequency equals to the frequency locked value;

the processing module further determines that the resonant frequency is unstable when the resonant frequency does not equal to the frequency locked value to further assign the newly measured resonant frequency as the frequency locked value.

8. The power supply device of claim 1, wherein the processing module determines whether the oscillating voltage is larger than a voltage locked value to retrieve a value that is the predetermined ratio of the voltage locked value as a threshold value when the oscillating voltage is not larger than a voltage locked value, the processing module further determines that the oscillating voltage decreases more than the predetermined ratio when the oscillating voltage is smaller than the threshold value and determines that the oscillating voltage does not decrease more than the predetermined ratio when the oscillating voltage is not smaller than the threshold value;

the processing module further determines that the oscillating voltage does not decrease more than the predetermined ratio when the oscillating voltage is larger than the voltage locked value to further assign the newly measured oscillating voltage as the voltage locked value.

9. A RF magnetic card identifying method used in a power supply device in an induction type power supply system, wherein the RF magnetic card identifying method comprises:

driving a power supply coil of the power supply device by a power supply driving module electrically coupled to the power supply coil;

measuring a resonant frequency of the power supply coil according to a capacitive and inductive parameter related to the power supply coil by a resonant frequency measuring module electrically coupled to the power supply coil;

driving an auxiliary coil of the power supply device by an auxiliary driving module electrically coupled to the auxiliary coil when the power supply driving module is under a non-working status;

tracking and locking a maximum of an oscillating voltage of the auxiliary coil by a voltage measuring module electrically coupled to the auxiliary coil; and keeping the power supply driving module under a non-working status by a processing module when the resonant frequency is determined to be stable and the oscillating voltage is determined to be decreased more than a predetermined ratio.

10. The RF magnetic card identifying method of claim 9, further comprising:

determining that a RF magnetic card exists within a power supplying range of the power supply coil when the resonant frequency is determined to be stable and the oscillating voltage is determined to be decreased more than a predetermined ratio.

11. The RF magnetic card identifying method of claim 9, further comprising:

generating a reference voltage by a digital to analog converter of the voltage measuring module; and receiving the reference voltage and a detected voltage related to the auxiliary coil to track and lock the oscillating voltage by a comparator of the voltage measuring module.

12. The RF magnetic card identifying method of claim 11, further comprising:

controlling the digital to analog converter to use the reference voltage to track and lock the oscillating voltage by using a feedback mechanism according to a comparison result of the oscillating voltage and the reference voltage by the comparator.

13. The RF magnetic card identifying method of claim 12, further comprising:

receiving a divided voltage of a voltage on the auxiliary coil as the oscillating voltage by the comparator.

14. The RF magnetic card identifying method of claim 9, further comprising:

keeping the power supply driving module under a working status by the processing module to drive the power supply coil to transmit a power signal when the resonant frequency is determined to be unstable and the oscillating voltage is determined to be not decreased more than a predetermined ratio.

15. The RF magnetic card identifying method of claim 9, further comprising:

determining whether the resonant frequency equals to a frequency locked value and determining that the resonant frequency is stable when the resonant frequency equals to the frequency locked value by the processing module; and determining that the resonant frequency is unstable when the resonant frequency does not equal to the frequency locked value to further assign the newly measured resonant frequency as the frequency locked value by the processing module.

16. The RF magnetic card identifying method of claim 9, further comprising:

determining whether the oscillating voltage is larger than a voltage locked value to retrieve a value that is the predetermined ratio of the voltage locked value as a threshold value when the oscillating voltage is not larger than a voltage locked value, and further determining that the oscillating voltage decreases more than the predetermined ratio when the oscillating voltage is smaller than the threshold value and determining that the oscillating voltage does not decrease more than the predetermined ratio when the oscillating voltage is not smaller than the threshold value by the processing module; and determining that the oscillating voltage does not decrease more than the predetermined ratio when the oscillating voltage is larger than the voltage locked value to further assign the newly measured oscillating voltage as the voltage locked value by the processing module.

* * * * *